United States Patent [19]

Kaltschmidt et al.

[11] 3,761,817

[45] Sept. 25, 1973

[54] METHOD AND TRANSMISSION SYSTEM FOR TRANSMITTING COMMANDS TO A RADIO GUIDED MISSILE

[75] Inventors: Horst Kaltschmidt, Neubiberg; Peter Scholler, Ottobrunn-Riemerling; Burkhard Flachmann, Munich, all of Germany

[73] Assignee: Messerschmitt-Bolkow-Blohm GmbH, Munich, Germany

[22] Filed: May 23, 1972

[21] Appl. No.: 256,180

[52] U.S. Cl. .................. 325/37, 325/41, 340/167 R

[51] Int. Cl. .................. H03k 13/32

[58] Field of Search .................. 343/225; 340/167 R, 340/168 R, 261; 325/37, 41, 42; 178/69.5 R

[56] References Cited

UNITED STATES PATENTS

| | | | |
|---|---|---|---|
| 3,523,278 | 8/1970 | Hinkel | 325/42 X |
| 3,566,268 | 2/1971 | Webb | 178/69.5 |
| 3,665,472 | 5/1972 | Kartchner et al. | 325/41 X |

*Primary Examiner*—Benedict V. Safourek
*Attorney*—John J. McGlew et al.

[57] ABSTRACT

In a method for the transmission of commands to a radio-guided missile or satellite, analog command bits are coded, in a transmitter, with signals from at least one random generator, and decoded in a receiver, on the missile or satellite, with the signals of the random generator being stored in associated storages in both the transmitter and the receiver, and before the missile or satellite is launched. In accordance with the invention, the random generator supplies multi-digit binary signals which are assigned individually to specific analog command bits, and these signals are stored in storages of the receiver. During transmission of commands, the storage signals are used as reference signals for comparison, by correlation, with each coded signal received by radio and, responsive to a predetermined agreement of the received coded signal with one of the reference signals, the analog command bit, assigned to such reference signal, is generated as a decoded signal. The apparatus includes a transmitting station and a receiving station having corresponding numbers of storages. The storages of the transmitter are connected through a logical circuit to an analog command signal generator, and the outputs of the storages are connected through a signal processing and modulation circuit to a transmitting stage which can be switched by a reversing switch to a transmitting antenna. An umbilical cord connects the ground station to the missile and is connected, in the missile, to a demodulation and signal processing circuit 20 and to a receiving antenna through an additional reversing switch. The output of the additional reversing switch is conducted, through further reversing switches in parallel with the storages in the missile. Transit storages, corresponding to the missile storages, are provided in association with a summation and comparison circuit and with the output of the demodulation and signal processing circuit. An output signal, corresponding to the analog command signal from the transmitter, is provided when the signals stored in two corresponding storages are identical.

18 Claims, 12 Drawing Figures

METHOD AND TRANSMISSION SYSTEM FOR TRANSMITTING COMMANDS TO A RADIO GUIDED MISSILE

FIELD AND BACKGROUND OF THE INVENTION

This invention relates to a method for transmitting commands to a radio-guided missile or satellite, where analog command bits are coded in a transmitter with signals originating from at least one random generator and are decoded in a receiver. The signals of the random generator are stored, prior to launching of the missile or satellite, in associated storages both in the transmitter and, through an umbilical cord connection, in the receiver.

In the guidance of missiles or satellites by radio, the problem of freedom from interference of the command transmission plays an important role, particularly in the military sector.

To solve this problem, reliance has hitherto been placed primarily on two different measures. In one case, the transmission band width, for the transmission of commands, preferebly is so selected as to make it difficult for an enemy, deliberately jamming the command transmission, to determine the transmission band width momentarily being used, so that a relatively high jamming energy is required to cover the momentarily used band for command transmission, and which is unknown to the enemy with an interference signal of a sufficient level. On the other hand, there are used methods for command transmission which permit a satisfactory recognition of the respective transmitted intelligence signal in the receiver, even when this intelligence signal is hidden in a strong interference, for example, in the noise.

In addition, the coding for such a command transmission must be selected so that an enemy listening in cannot recognize in what parts of the transmission signal the information representing the command, to be transmitted, is contained. In this way, it is intended to prevent a signal interference by the enemy.

Thus, a command transmission method is described in U.S. Pat. No. 2,530,140, wherein a signal of random distribution, for example a noise signal, is used as a code, and this is stored in the transmitter and in the receiver over a galvanic connection therebetween, to be used, in the transmitter, for coding and, in the receiver, for decoding, the respective transmitted signal.

SUMMARY OF THE INVENTION

The object of the invention is to improve such a method for transmitting commands to a radio-guided missile so that the above-mentioned requirements are met ideally.

Another object is to provide a command transmission system for carrying out this method in a simple and reliable manner.

In accordance with the invention, the problem is solved, in a method of the above-mentioned type, in that the random generator supplies multi-digit binary signals which are associated individually with certain analog command bits. These signals, after they have been stored in the storage of the receiver, serve as reference signals which are compared, during a command transmission, by correlation simultaneously with each coded signal received by radio. Thus, with a certain agreement of the coded signal with one of the reference signals, the analog command bit associated with this reference signal is generated, as a decoded signal, in the receiver of the flying object.

In the invention method, multi-digit binary signals, whch have a random distribution, are thus used for coding command bits so that the latter also have a random distribution. Such binary signals can be obtained, by way of example, from a conventional noise generator, if the noise signal is transformed, through a limiter, into a binary signal which has only the two level values O and L. These signals, which vary at any time, are stored in the individual storages in the transmitter, and the probability that two signals, taken from the noise generator, at different times can be equal is reduced by the fact that a possibly multi-digit binary signal is formed from these. Each storage, and thus the binary signal of random sequence stored therein, can be assigned to a certain command bit to be transmitted. These binary signal sequences, of random distribution stored in the storages of the transmitter, are now stored, prior to the firing of the missile, in similar storages of the missile, and are there available as reference signals after the firing of the missile. Subsequent so such firing, each signal received, to guide the missile, is compared simultaneously, that is, in parallel with all the reference signals stored in the missile. If one of the reference signals is identical with the coded signal just received, an analog command bit, associated with the respective storage of the missile, is supplied, and corresponds exactly to the analog command bit which is also associated with the respective storage in the transmitter.

In accordance with a further development of the invention, the coded signals and the transmitter are modulated, in accordance with a certain additional signal, upon a frequency-modulated carrier frequency supplied from a random source, the same signal, originating from this or from a second random source being also supplied to the receiver on the missile to demodulate the carrier frequency. By virtue of this measure, the carrier frequency used in the radio transmission is again coded, and a strictly random signal sequence is used also for the frequency modulation of this carrier frequency. This strictly random signal sequence can likewise be supplied from a noise generator, and is supplied both to the transmitter and to the receiver on the missile prior to firing of the missile. This assures than an enemy listening in on the radio transmission can recognize, only with difficulty, the carrier frequency, frequency-modulated according to a random sequence and, since the modulation signal is formed strictly at random, the enemy does not have the code to demodulate this carrier frequency.

As previously mentioned, noise generators can be used as random sources when the noise signals are transformed through limiters into binary signals. In accordance with another feature of the invention, generators composed of feedback shift registers also can be used as random sources with which a binary signal, of pseudo-random distribution is generated, depending on the selection of the feedback connection between two or more of the individual shift storages.

In accordance with another embodiment of the invention, the generation and the processing of the signals are synchronized, both in the transmitter and in the receiver on the missile, by respective time circuits, the two time circuits being synchronized with each other prior to firing or launching of the missile. Due to the separate time circuits provided in the transmitter and in the receiver on the missile, no synchronization pulses need be transmitted during transmission of commands. Both the transmitter and the missile-mounted receiver thus have thier own time circuits controlling the generation and the processing of the signals, and which have a sufficiently high and synchronous time accuracy due to the synchronization immediately before the firing or launching of the missile.

In accordance with another embodiment of the invention, the binary signals are transformed into two-frequency signals and modulated upon the carrier frequency through an intermediate frequency. In the receiver, the binary signals are obtained through the intermediate frequency from the carrier frequency by demodulation, the two frequency signals are separated from each other by band pass filters, and the separated signals are supplied through respective envelope-detectors to a comparator at whose output one of the two binary states is determined, depending upon the result of the comparison between the two signals supplied from the respective envelope detectors.

By means of these envelope detectors, which work on the principle of a frequency-selective frequency voltage converter, it can be determined, at any time, by means of a comparator, which of the two frequency signals has a higher level in the received signal. By this expedient, it is possible to avoid the use of otherwise used threshold value switches which would have to be set to an absolute level, and which involves the risk that such a threshold value switch will respond, due to an interference, even though there is no intelligent signal with one of the frequencies to be determined.

According to a preferred embodiment of the invention, the signal tapped in the receiver at the output of the comparator is stored in associated with the storages provided in the receiver. The contents of two associated storages are constantly compared with each other and, if the signal just stored in a transit storage is identical with a reference signal of the associated storage, a signal corresponding to the analog command bit is supplied by a comparison and summation circuit which effects the comparison.

The final recognition of the signal in the receiver of the flying object is thus effected in accordance with a correlation method using a so-called adapted filter, with which an intelligence signal, hidden in a strong interference signal, can be recognized positively. This so-called adapted filter consists of one of the storages with an associated transit storage, as well as of a comparison and summation circuit comparing the contents of corresponding storage places of the two storages. By means of the reference signal atored in the stroage, the filter is "adapted" to this reference signal, so that it supplies a maximum output signal only when the reference signal, used for its adaptation, just appears in the transit storage.

In further accordance with theinvention, the command transmission system, for a radio-guided missile, includes a transmitter supplying the commands and a receiver in the missile, and is particularly suitable for performing the method of the invention. In the command transmission system, the transmitting and receiving stations have corresponding numbers of storages, and the control inputs of the storages of the transmitting station are connected through a logical circuit to an analog command signal generator. The storage inputs are connected to a binary random source, and the outputs of the storages are connected, through a signal processing and modulation circuit, to a transmitting stage. Through the medium of a reversing switch, the transmitting stage can be switched between a transmitting antenna and an umbilical cord connection leading to the missile.

In the missile, this umbilical cord connection is connected to a demodulation and signal processing circuit which is connected thereto through an additional reversing switch whose output is supplied, through further reversing switches, in parallel, to the storages provided in the missile. In the missile, there are also provided transit storages corresponding with each of the main storages and connected thereto through a summation and comparison circuit. These transit storages are connected, through the same further reversing switches, to the output of the demodulation and signal processing circuit. An output signal, corresponding to the analog command signal generated in the transmitter, is tapped at the output of each summation and comparison circuit, if the signals stored in the two corresponding storages are identical. With this relatively simple command transmission system, including the transmission station and the receiving station, with the latter arranged in the missile, the method of the invention can be performed in a simple and reliable manner.

In accordance with the preferred embodiment of the command transmission system, both the storages and the transit storages are designed as shift registers. Furthermore, in accordance with another embodiment of the invention, a time circuit, controlled by a quartz clock, is provided both in the transmitting station and in the receiving station for the sequential control of the signal flow. These time circuits are so connected with each other, through the umbilical cord connection up to the firing or launching of the missile, that the time circuit of the receiving station is controlled by that of the transmitting station.

According to yet another embodiment of the invention, two first oscillators, oscillating with respective different frequencies, areprovided in the transmitting station, and each oscillator is associated with a state of the binary signal sequences. These oscillators can be switched alternately, through a switch controlled by the binary signal, to the input of a first mixer stage whose other input is connected to a third oscillator oscillating with an intermediate carrier frequency. The output of the mixer stage is conencted through band filters, blocking undesired modulation products, to a second mixer stage, whose other input is connected to a fourth oscillator which oscillates with a carrier frequency which is frequency-modulated by a control voltage. The output of the second mixer stage is connected, through a third band filter blocking undesired modulation products, through the transmitting stage, which latter is connected, through the reversing switch to the transmitting antenna or to the umbilical cord connection to the missile A similar circuit arrangement, provided in the receiving station, corresponds to this circuit arrangement for processing and modulating signals provided in the transmitting station, and the circuit arrangement in the receiving station is effective to demodulate the received signal and to process the same.

To this end, a band filter, connected to the second reversing switch, is provided in the receiving station, and is connected to a fourth mixer stage whose other input is connected with a fifth oscillator whose frequency is frequency-modulated with the same time-dependent control voltage as the fourth oscillator. The output of the fourth mixer stage is connected, through a band filter adapted to the modulated intermediate frequency, to a fifth mixer stage, whose other input is connected with a sixth oscillator oscillating with the intermediate carrier frequency. The output of the fifth mixer stage is connected to two band filters adapted to the respective frequencies of the first two oscillators, and these two band filters, in turn, are connected through respective envelope detectors to a comparator whose output is connected, through the other reversing switches, to the storages and the transit storages.

In a further embodiment of the invention, threshold value switches are connected in series with the summation and comparison circuits of the receiving station, and are so balanced that they respond if a signal, just stored in the transit storages, shows a certain agreement with a reference signal stored in the shift register. To each threshold value switch, thereis connected a digital-analog converter, whose output can supply a command bit corresponding to the respective reference signal.

In still another embodiment of the invention, a revertive communication line, leading to the umbilical cord connection, is connected additionally to the outputs of the threshold value switches. By means of this communication line, test signals can be sent to the transmitting station up till the time the missile is fired or launched. This additional measure permits, in a simple manner, testing the operation of the command transmission system immediately before the missile is fired. This is effected, for example, by storing, after the reference signals stored in the storages of the transmitting station have been stored in the storages of the receiving station, the same reference signal again in the transit storages of the receiving station, with the signal being supplied through the revertive communication line to verify the readiness of the command transmission system by the threshold value switches of the receiving station.

An object of the invention is to provide an improved method for transmitting commands to a radio-guided missile or satellite.

Another object of the invention is to provide an improved command transmission system for performing the method in a simple and reliable manner. A further object of the invention is to provide such a method and system which is free of interference by an enemy and provides the satisfactory recognition of transmitted intelligence signals in a receiver.

Another object of the invention is to provide such a method and system utilizing a signal of random distribution, such as a noise signal, as a code.

For an understanding of the principles of the invention, reference is made to the following description of typical embodiments thereof as illustrated in the accompanying drawing.

BRIEF DESCRIPTION OF THE DRAWING

In the drawing:

FIG. 10 is a schematic block diagram of the signal processing and modulation circuit of the transmitting station shown in FIG. 1*a;* and FIG. 11 is a schematic block diagram of the demodulation and signal processing circuit of the receiving station shown in FIG. 1*b*.

DESCRIPTION OF THE PREFERRED EMBODIMENTS

Figure 1A:
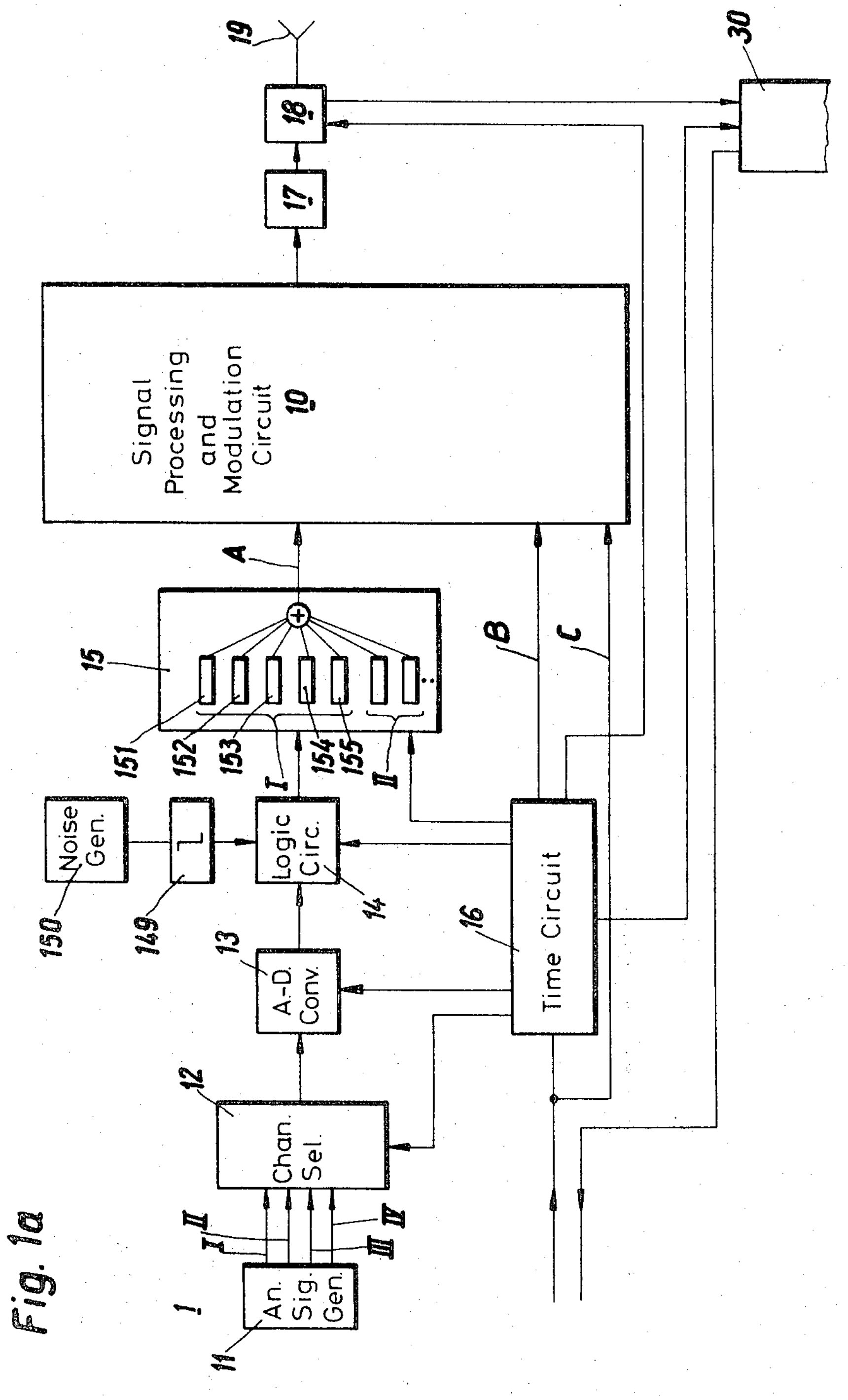
FIG. 1*a* is a block circuit diagram of the transmitting station of the command transmission system.
Figure 1B:
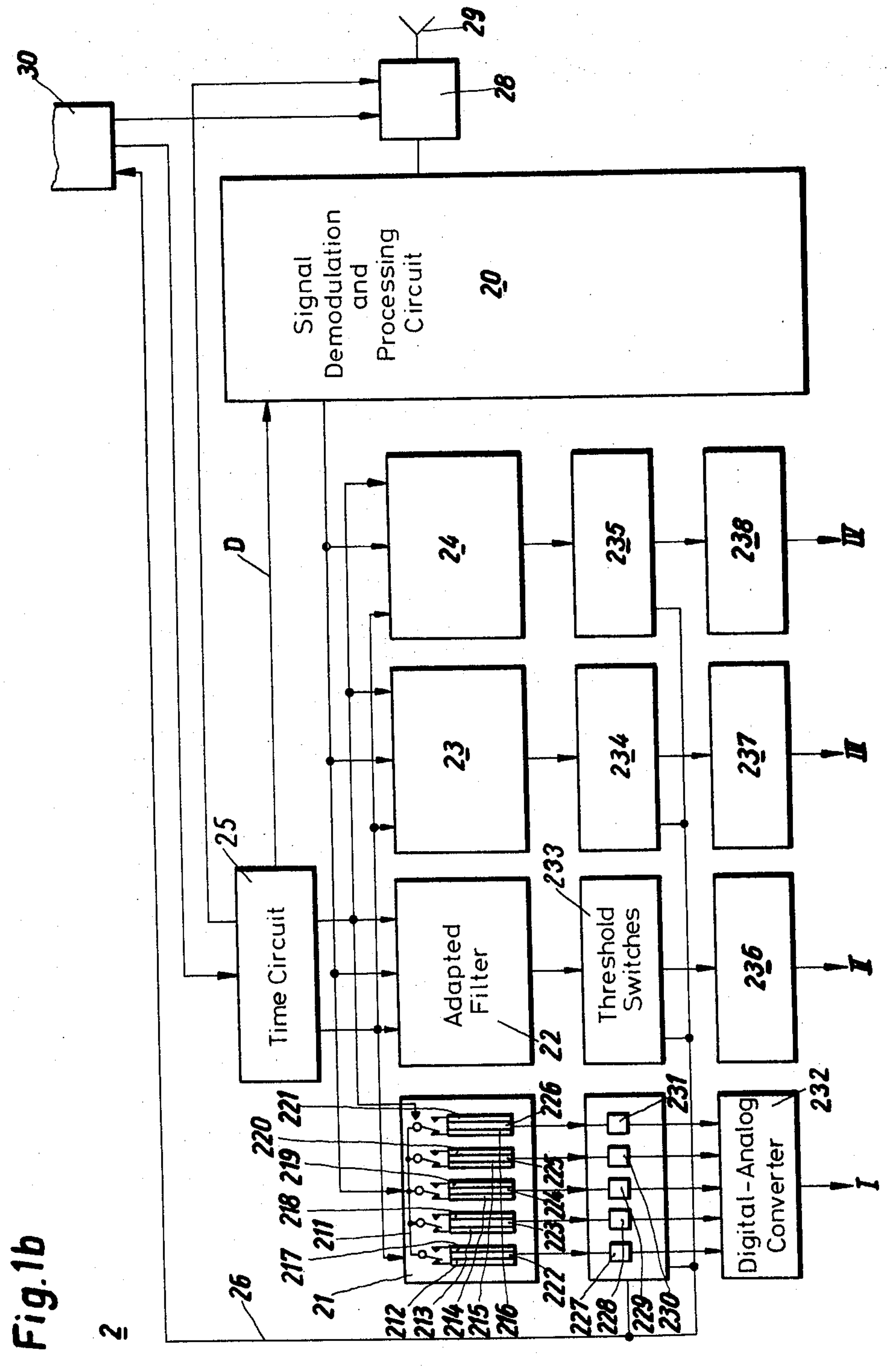
FIG. 1*b* is a block circuit diagram of the receiving station of the command transmission system, and which is arranged in the missile.

The command transmission system illustrated schematically in FIGS. 1*a* and 1*b* consists of a transmitting station 1 and a receiving station 2. In the example described herein, transmitting station 1 is arranged in an aircraft carrying an air-surface or air-air missile, and receiving station 2 is arranged in this missile. Naturally, transmitting station 1 also could be arranged as a stationary ground station, in an earth-bound vehicle or in a water-borne craft. In transmitting station 1, an analog signal generator 11, not illustrated in detail, supplies analog command bits through four separate channels I, II, III, and IV to a channel selector circuit 12, and the analog command bits are successively transmitted, individually for each channel, to an analog-digital converter 13. The digital signal of converter 13 is supplied, through a logical circuit 14, to a circuit 15 in which a certain binary signal sequence is selected, depending on its size. The components 12, 13, 14, and 15 are so controlled, by a central time circuit 16 provided in transmitting station 1, that a certain digital value is assigned, successively for each individual channel through analog digital converter 13, to the respective analog signal generated by analog signal generator 11. To this digital value, there is then assigned a binary signal sequence, in circuit 15, provided for the respective channel and the respective value.

The output A of circuit 15 is connected to a signal processing and modulation circuit 10, described hereinafter, whose output is connected through a transmitting station 17 and a reversing station 18 to the antenna 19 of transmitting station 1. Lines lead from switch 18 and central time circuit 16 through an umbilical cord connection 30 to the receiving station 2 of the missile, the umbilical cord connection 30 being severed during or immediately before the firing or launching of the missile.

In receiving station 2 of the missile, there is provided a receiving antenna 29 which can be connected, through a reversing switch 28, to a demodulation and signal processing circuit 20, described hereinafter. In addition, a line connection, from reversing switch 18 to transmitting station 1, can be switched through reversing switch 28 and umbilical cord connection 30, directly to demodulation and signal processing circuit 20. The output of circuit 20 is connected in parallel to four so-called "adapted" filters 21, 22, 23 and 24, each assigned to a respective channel.

As schematically represented for filter 21, each adapted filter comprises a reversing switch 211, which switches the output signal of demodulation and signalling processing circuit 20, in parallel, to a row of storages 212, 213, 214, 215 and 216. Each of these storages has assigned thereto a respective transit storage 217, 218, 219, 220 and 221 whose inputs are connected, through the other position of reversing switch 211, in parallel to the output signal of demodulation and signal processing circuit 20. The individual storage places of each storage 212 – 216 are connected with the corresponding transit storages 217 – 221 through respective comparison and summation circuits 222, 223, 224, 225 and 226, whose outputs are connected individually to respective threshold value switches 227, 228, 229, 230 and 231.

The outputs of threshold value switches 227 – 231 control inputs of the digital-analog converter 232, which supplies a certain analog output signal of a certain size to channel I of transmitting station 2, in dependence on which of the threshold value switches responds. Adapted filters 22, 23 and 24 are designed exactly like adapted filter 21, and each is also provided with a number of series-connected threshold value switches such as generally indicated at 233, 234, and 235, as well as with respective digital analog converters such as 236, 237 and 238 whose outputs are connected to respective channels II, III, and IV of receiving station 2.

Receiving station 2 also has a simple time circuit 25 which controls reversing switch 28, demodulation and signal processing circuit 20 and adapted filters 21 – 24. The threshold value switches 227 – 231, 233, 234 and 235, assigned to respective individual channels I, II, III and IV, each have an additional output and these additional outputs are connected, in parallel, to a revertive communication line 26 connected, through umbilical cord connection 30, to transmitting station 1.

The storages provided in circuit 15 of transmitting station 1 for each channel, and illustrated for channel I, are designed, for example, as shift registers 151, 152, 153, 154 and 155. These storages can be supplied, for example, from a noise generator 150 through a limiter 149, so that a binary noise signal sequence, taken at any time from noise generator 150, is stored in each individual storage.

Figure 2:
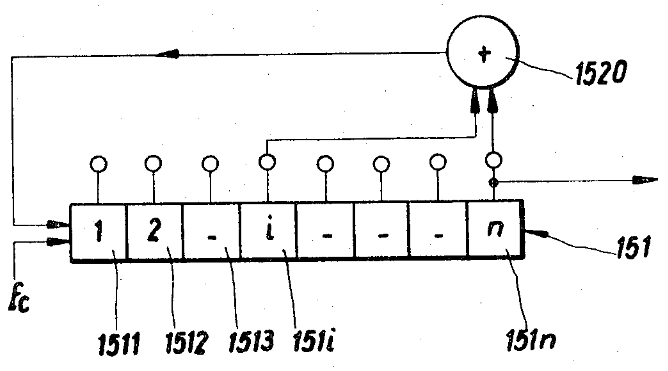
FIG. 2 is a schematic illustration of a binary random generator comprising a feedback shift register.

Alternatively, the storages of circuit 15, designed as shift registers, can also be used directly for generating binary signal sequences of pseudo-random distribution. An example of such a shift register is shown in FIG. 2 wherein a shift register, corresponding, for example, to storage 151 of circuit 15, has $n$ storage places 1511, 1512, 1513, 151i. . . .151n. The respective outputs of storages places 151i and 151n are connected, through a binary adder 152o, to the input of the first storage place 1511 of shift register 151. A cycle frequency $fc$ is supplied to the input of shift register 151. If a certain initial state, which must differ from zero, is stored in feedback shift register 151, each storage place provides a binary signal sequence, if the cycle frequency is supplied, which consists of $N=2^n-1$ binary random numbers and which recurs after N-cycles. In this way, a binary sequence having a period N is formed, for example at the output of the last storage place 151n, and whose individual digits can assume only the two level values O and L and which are apparently distributed at random.

The binary signal sequences of random distribution, generated with such a feedback shift register, vary for each storage provided in circuit 15, and a certain channel as well as digital value, transmitted by analog-digital converter 13 through logical circuit 14 to circuit 15, is assigned to each respective storage. The binary coded signal thus generated is processed and modulated in a manner to be described hereinafter, and then transmitted to receiving station 2. In receiving station 2, these coded signals are demodulated in demodulation and signal processing circuit 20, in a manner described hereinafter, and are subsequently stored in parallel in all transit storages, such as the transit storages 217 – 221, provided in the individual adapted filters 21 – 24. It is only when this coded signal is identical with a reference signal initially stored in the individual storages, for example 212 – 216, that an output signal of this magnitude appears at the output of one of the comparison and summation circuits, for example 222 – 226, which causes one of the threshold value switches, for example 227 – 231, to respond. Each reference signal stored in a respective individual storage, for example the storages 212 – 216, corresponds to a respective one of the binary random sequences supplied by the shift registers, for example 151 – 155, of circuit 15. The design and the method of operation of the adapted filters of receiving station 2, composed of several individual filters, are described more fully with respect to FIG. 3.

Figure 3:
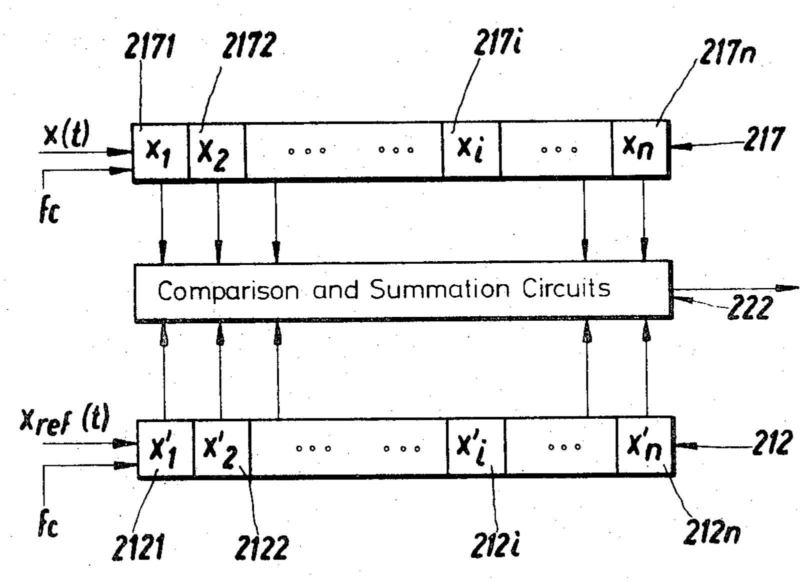
FIG. 3 is a schematic representation of an adapted programmable filter used in the receiving station.

Referring to FIG. 3, each individual filter, to be adapted with a reference signal to a certain intelligence signal to be recognized, comprises a first shift register 212 and a second shift register 217 which is designed as a transit storage. The individual storage places 2121, 2122, 212i to 212n of shifter register 212 are connected with corresponding storage places 2171, 2172, 217i to 217n through a comparison and summation circuit 222. In the first shift register 212, there is stored, for example, a reference signal corresponding to a binary signal sequence from one of the shift registers 151 – 155 of circuit 15 of transmitting station 1, and this reference signal remains in the shift register. In the second shift register 217, acting as a transit storage, there is stored, however, the signal received from receiving station 2, and which is correspondingly demodulated and processed through demodulation and signal processing circuit 20. Comparison and summation circuit 222 determines, at each moment, how many of the contents stored in the corresponding storages places of the two shift registers 212 and 217 are identical. The output signal of circuit 222 attains a maximum value whenever the storage contents of all storage places of shift register 217 are identical with all storage contents of the storage places of shift register 212. At this moment, the coded signal received by receiving station 2 is identical with the reference signal stored in the adapted filter, so that an analog command signal, corresponding to exactly this reference signal, is supplied through a threshold value switch, as shown in FIG. 1_b_, and through the series connected digital-analog converter. Details of the wiring of such an adapted filter to recognize intelligence signals contained in the strong interference signal, as well as its method of operation, are well known.

Figure 4:
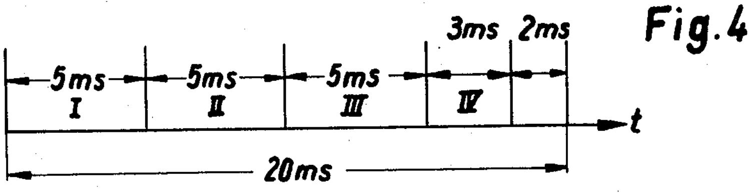
FIG. 4 is a graphical illustration of the time multiplex division for four command transmission channels.

The analog command bits, generated in transmitting station 1 by analog signal generator 11, are scanned, successively for each channel, according to the time multiplex method, as schematically illustrated in FIG. 4. Each channel is interrogated 50 times per second, which provides a cycle time of 20 ms. The scanning time for each of the first three channels I, II, and III is 5 ms. and, for the fourth channel IV, 3 ms., since only switching signals, requiring a smaller frequency band width, are transmitted with channel IV. The shorter scanning time of the fourth channel results, for the successive scanning cycles, in a safety margin of 2 ms., so that their satisfactory operation is assured.

Figure 5:
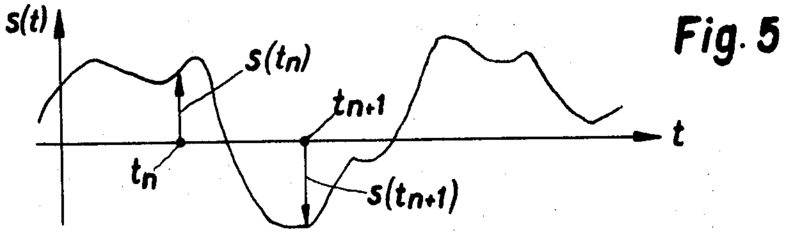
FIG. 5 is a diagram graphically illustrating the scanning of the analog signal to be transmitted through a channel.
Figure 6:
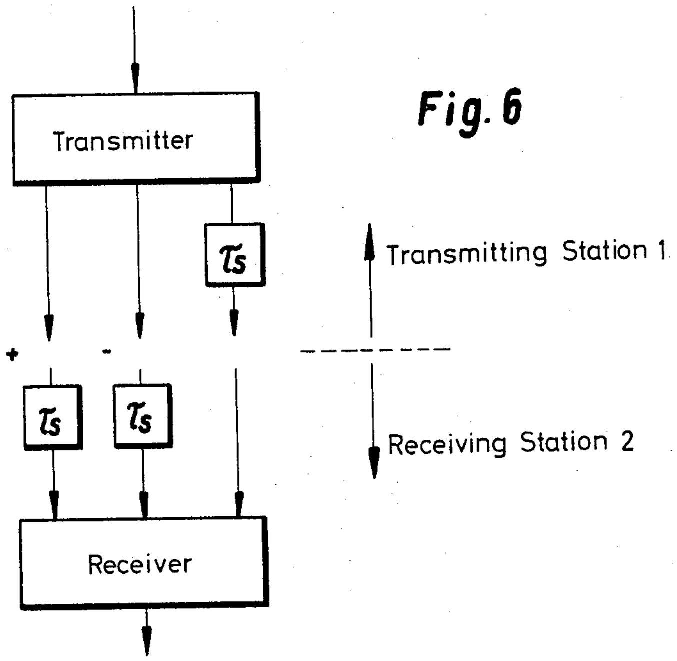
FIG. 6 schematically illustrates the processing of a signal, to be delayed in a certain manner, for the transmission of individual command bits according to the pulse position modulation method (PPM)

FIG. 5 illustrates schematically how an analog command signal $s(t)$ of a channel is scanned at the time $t_n$ with a positive amplitude value $s(t_n)$ and, at a second time $t_n+1$, falling into the following scanning cycle, with a negative amplitude $s(t_n+1)$. If these signal amplitudes, of a channel scanned at different times are to be transmitted according to the PPM method, a "+start" or a "−start" pulse is released at the beginning of the channel transmission time of ms., depending on the sign of the scanned amplitude value, and after a time $t_s$, which is proportional to the respective amplitude value $s_n$ at the time $t_n$, this pulse is followed by a "stop" pulse while, in the receiving circuit, the "start" pulse is delayed again by this time period $\tau_s$. This delay of the "stop" pulse is delayed again by the time period $\tau_s$. The delay of the "stop" pulses in the transmitting station 1 and of the "start" pulses, with different signs, in receiving circuit 2, is illustrated schematically in FIG. 6.

Figure 7:
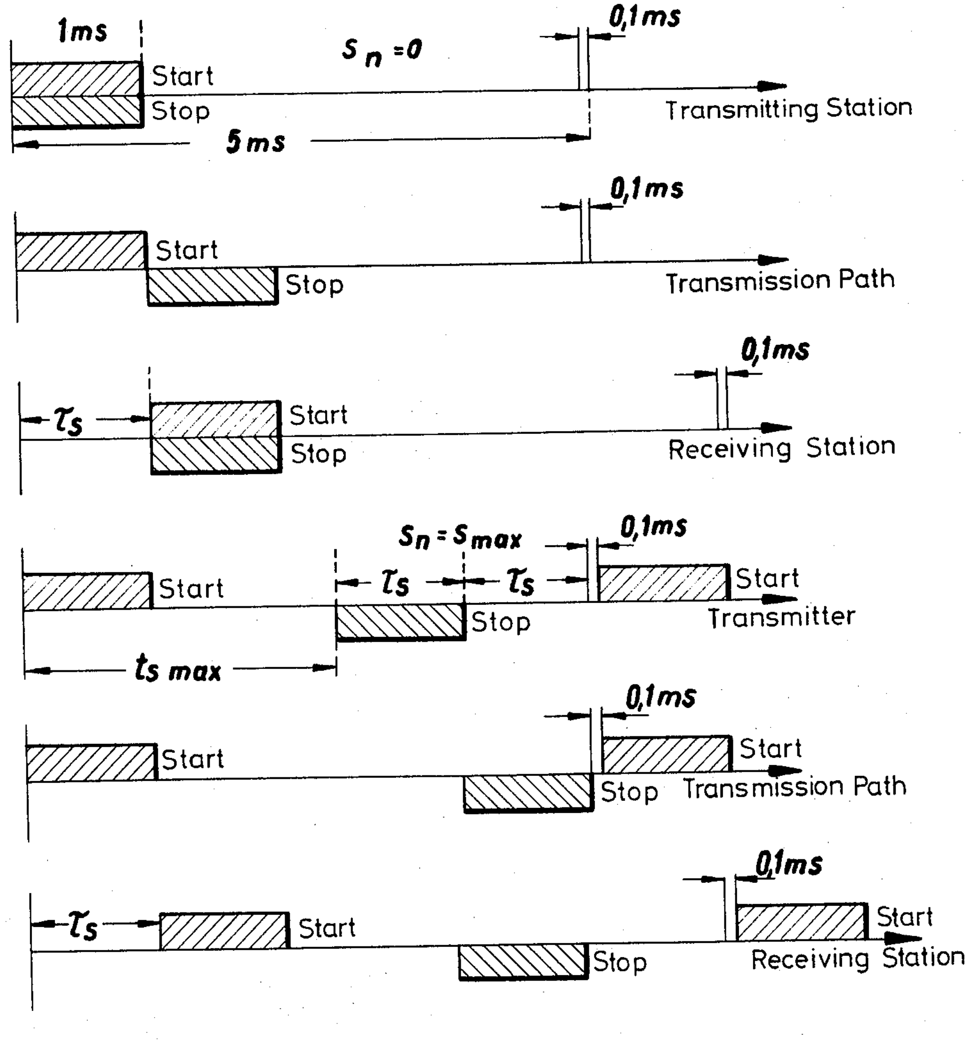
FIG. 7 is a pulse sequence diagram for the transmission in a PPM channel.

The different pulse sequences, resulting according to the PPM method after channel scanning and subsequent individual pulse delay, are illustrated in FIG. 7. The first three lines illustrate schematically how an amplitude value $s_n$=0 is transmitted. The lower lines of FIG. 7 illustrate, however, the transmission of a maximum possible amplitude value $s_n=s_{max}$ , where the different pulse sequences from the delay of the "stop" and "start" pulses in the transmitting and receiving station, as well as in the transmission zone, are represented.

Figure 8:
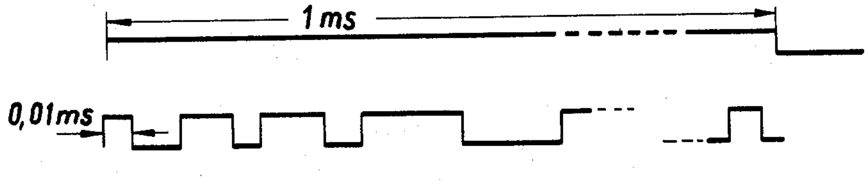
FIG. 8 is a schematic illustration of the microstructure of a command pulse represented in FIG. 7, which is formed by a multi-digit binary signal sequence.

FIG. 8 indicates how an individual pulse, which can be either a "start" or a "stop" pulse is coded by a multidigit binary signal sequence which is generated in circuit 15 of transmitting station 1. In the PPM method for transmitting the individual command bits, as illustrated in FIGS. 5 – 8, a maximum of three different binary signal sequences is required for each individual channel. One of these binary signal sequences is assigned to the positive "start" pulse, one to the "negative" pulse and the third to a "stop" pulse. In the transmission of the command bits according to the PPM method, three different shift registers therefore would be required, for each channel in circuit 15 in transmitting station 1 as shown in FIG. 1_a_. Likewise, in receiving station 2 only three individual filters, each to be adapted to one reference signal, would be required for each adapted filter, that is, for each channel.

Instead of the above-described transmission of the respective scan values in analog form, where the distance between the "start" and the "stop" pulse can assume any desired value within certain limits, a quantized transmission of the respective scan values also can be effected. Such a transmission is always preferred when relatively few quantizing stages have to be selected for the analog value appearing in a channel. A transmission with quantizing stages has the advantage that a PCM method can be used instead of a PPM method, since the signals coded according to this method make it easier to recognize, from a strong interference signal, a reception signal.

Figure 9:
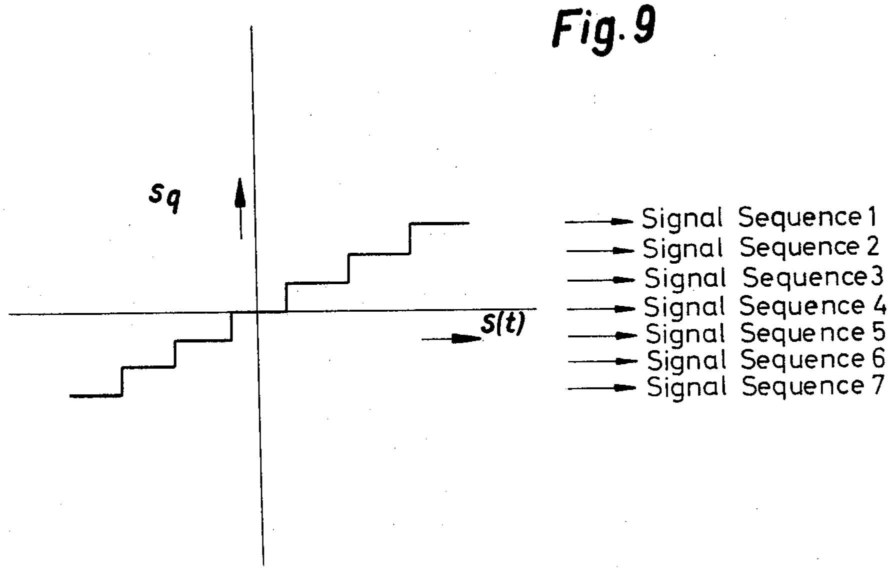
FIG. 9 schematically illustrates the transformation of an analog scanning signal into quantized values to each of which is assigned an individual multi-digit binary signal sequence in order to be able to transmit the respective analog scanning signal according to the pulse-code modulation method (PCM)

FIG. 9 illustrates schematically how a certain quantizing stage must be assigned to each amplitude value of the analog signal scanned in an individual channel, and individual binary signal sequence being required for each of the different seven quantizing stages shown in FIG. 9. In this method, the channel separation also must be effected through different binary signal sequences so that, with seven quantizing stages per channel, a total of 28 different binary signal sequences are required for the transmission of analog signals for four channels. Such a method, with seven quantizing stages, thus would require seven shift registers for each channel in circuit 15. Likewise, seven different individual filters, each to be adapted to a respective reference signal, would be required in the receiving station for each filter 21 – 24, since seven different signals must be spearable from each other, for each individual channel, in receiving station 2 also.

Figures 10, 11:
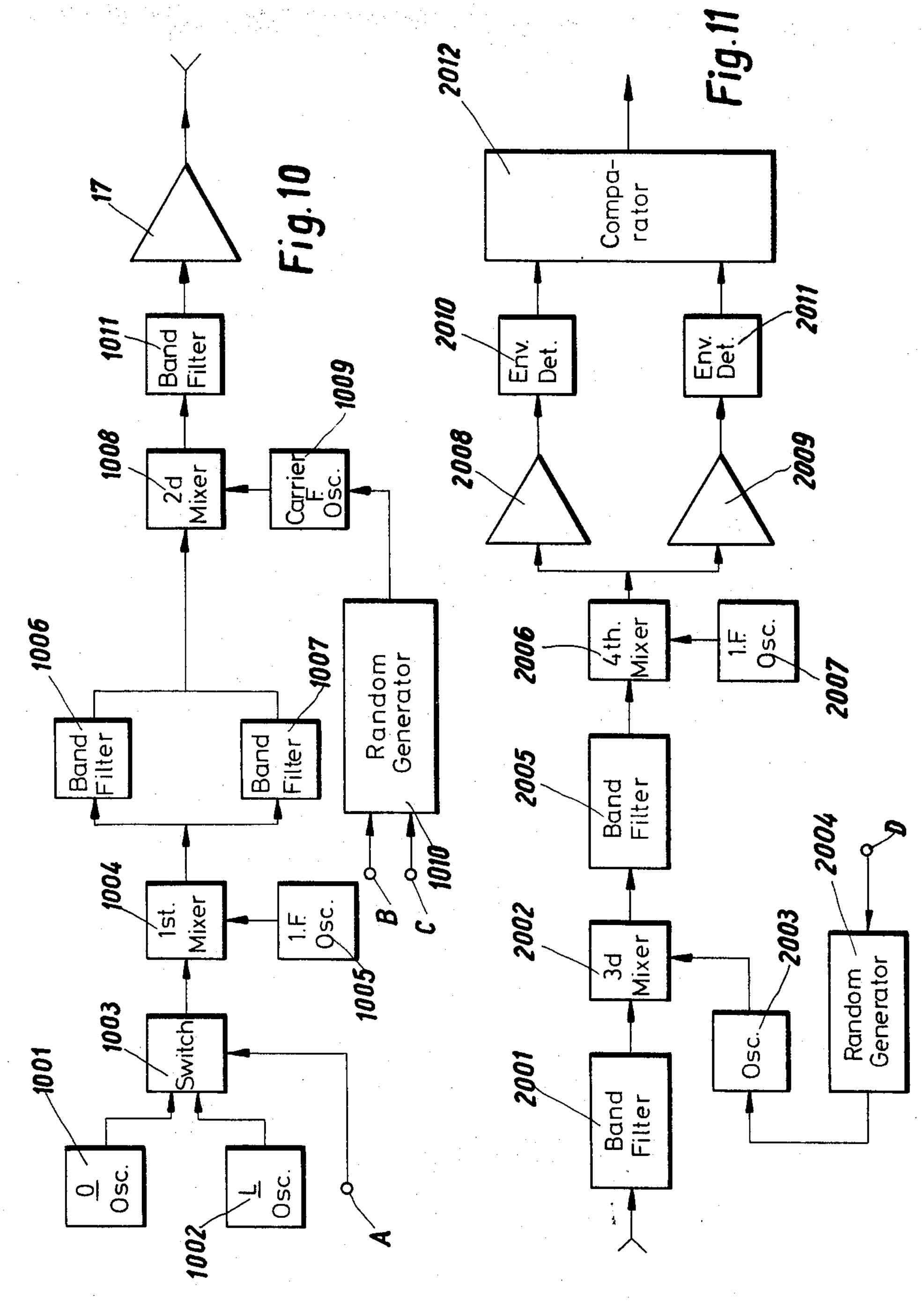

FIG. 10 illustrates signal processing and modulation circuit 10 of transmitting station 1. The binary signal sequences arriving from circuit 15 in station 1 travel over line A to the control input of a switch 1003 which switches two oscillators 1001 and 1002, oscillating at respective different frequencies, in the rhythm of the respective signal sequence, to a first mixer stage 1004. The frequency of oscillator 1001 represents the binary state O, and the frequency of oscillator 1002 represents the binary state L, of the respective binary signal frequency arriving at switch 1003. The second input of mixer stage 1004 is connected to a third oscillator 1005 which oscillates with an intermediate carrier frequency on which the two frequencies, representing the respective binary signals, are mixed.

The output of mixer stage 1004 is connected, through two band filters 1006 and 1007 blocking undesired modulation products, to a second mixer stage 1008 whose other input is connected to a fourth oscillator 1009. Oscillator 1009 oscillates with a carrier frequency to be transmitted, and this carrier frequency is frequency-modulated by a control voltage supplied from another random generator 1010 which can be designed, for example, like the random generator shown in FIG. 2. Random generator 1010 is controlled, through a line B, from time circuit 16 of transmitting station 1, and is pre-programmed through a line C, for a certain binary signal sequence. On the carrier frequency, frequency-modulated according to the control signal of random generator 1010 in mixer stage 1008, there is modulated the frequency-modulated intermediate carrier frequency, indicating the two different binary states. The output of mixer stage 1008 is conducted to transmitting stage 17 shown in FIG. 1_a_, through an additional band filter 1011 which likewise blocks undesired modulation products.

FIG. 11 illustrates demodulation and signal processing circuit 20 of receiving station 2. The signal received by receiving antenna 29, shown in FIG. 1*b*, is transmitted through a band filter 2001, which blocks interference signals outside the transmission band width, to a third mixer stage 2002, whose other input is connected to a fifth oscillator 2003 oscillating with the same frequency as fourth oscillator 1009 of circuit 10 of transmitting station 1. The frequency of fifth oscillator 2003 is also frequency-modulated by a control voltage supplied by an additional random generator 2004. Generator 2004 is so programmed, in a suitable manner and before the missile is fired, for example, over the umbilical cord connection 30, time circuit 25 and a line D, that it make available, through signal processing and modulation circuit 10 of transmitting station 1, in synchronism with the random generator, the same binary signal sequence of random distribution, for the frequency modulation of the frequency supplied by fifth oscillator 2003.

From the output of mixer stage 2002, there thus can be tapped a reception signal, mixed with the carrier frequency, frequency-modulated according to a certain pattern, and this signal is transmitted to an additional band filter 2005 in order to block undesired modulation products. The output of band filter 2005 is connected to a fourth mixer stage 2006, whose other input is connected to a sixth oscillator 2007 oscillating with the same intermediate carrier frequency as third oscillator 1005 of transmitting station 1. Therefore, at the output of mixer stage 2006, there are again available the two first frequencies, of the first two oscillators 1001 and 1002 of signal processing and modulation circuit 10, in the pattern of the respective binary signal sequences just transmitted.

Each of the two frequency signals is transmitted through a respective band filter 2008 and 2009 to a respective envelope detector 2010 and 2011, each of which can be considered a frequency-selective voltage transformer and which supplies a voltage signal corresponding to the level of the frequency to be determined. These voltage signals, which are supplied at any time from envelope detectors 2010 and 2011, are transmitted to the inputs of a comparator 2012, which compares the two voltages with each other. If the voltage supplied by envelope detector 2011, which corresponds to the frequency representing the binary signal state L is greater than the voltage supplied by envelope detector 2010, which corresponds to the frequency representing the binary signal state O, a voltage level, corresponding to the binary signal L, is supplied at the output of comparator 2012. However, if the output voltage of envelope detector 2010 is greater than that of envelope 2011, a voltage level corresponding to the binary signal state O is supplied at the output of comparator 2012.

The binary signal sequence, appearing at the output of comparator 2012 of demodulation and signal processing circuit 20, thus corresponds, at any time, to the binary signal sequence supplied originally by circuit 15 of transmitting station 1, and which is assigned to a specific command bit to be transmitted. This binary signal sequence from circuit 20 in receiving station 2 is now supplied in parallel to all the adapted filter 21 – 24, and therein it is compared, in the manner described above, simultaneously with all frequency signals stored for adaptation of the individual filters. If the binary signal sequence received is identical with one of the reference signals, an individual threshold value switch of the various adapted filters responds, and causes an analog command bit to be supplied over the series connected digital-analog converter, this command bit corresponding to the analog command bit generated by signal generator 11 and transmitting station 1 and which is assigned to the channel determined in the transmitting station.

Before the missile is fired or launched, binary signal sequences are generated in the transmitting station, and are taken either from noise generator 150 and stored in shift registers 151 – 155 with circuit 15 or are generated, in the case of shift registers designed as shown in FIG. 2, directly by the latter, and these are transmitted successively over umbilical cord connection 30 to receiving station 2 of the missile. In this transmission, the binary signal sequences are processed in the above-described manner and modulated upon the frequency-modulated carrier frequency. However, they are not radiated over the transmitting and receiving antennas, but are transmitted through reversing switches 18 and 28, over umbilical cord connection 30.

The binary signal sequences thus transmitted are stored successively in the storages of adapted filters 21 – 24, as reference signals. After all reference signals have been stored, the binary signals are again transmitted, but this time they are inserted, as in the normal command transmission method, into the transit storages of the adapted filters, so that the threshold value switches successively supply signals which are transmitted over revertive communication line 26 to transmitting station 1 and therein recorded as a check signal. It is only after the complete check signal has been received that the missile is released for firing or launching.

The command transmission method of the invention, and the command transmission system particularly suitable for carrying out this method, have a hitherto unknown degree of safety as compared to the aimed and unaimed jammings by an enemy. Signal recognition by the enemy, which requires knowledge of the respective code and which alone would permit a signal-specific jamming of the command transmission, thus is impossible. Even if the coding method as such were betrayed to the enemy, decoding and demodulation. respectively, of the transmitter signal still is not possible since the enemy does not know the binary signal sequences momentarily being used. If the binary signal sequences are derived, for example, from the output of a conventional noise generator, decoding of the transmitter signal is impossible, since the noise signals of a noise generator, taken at different times, always differ from a signal sequency of equal length, taken at any other time.

Due to the frequency modulation of the carrier frequency used for the command transmission by a binary signal, also of random distribution, the transmitted signal is coded again and can be decoded only if the respective binary signal sequence, of pseudo-random distribution, then being used is known. The double coded transmission signal additionally can be masked by a strong noise radiated simultaneously either from transmitting station 1 or from an adjoining separate transmitter, so that an enemy listening in can neither determine positively the intelligence signal source itself or the transmission of an intelligence signal in general.

Although the transmission method of the invention, and the command transmission system for carrying out the method, have been described using a missile guided by radio as an example, the method and the system naturally can be used also, with the same advantages, for other secret communication transmission methods where the contents of the message must be kept secret from third parties.

While specific embodiments of the invention have been shown and described in detail to illustrate the application of the principles of the invention, it will be understood that the invention may be embodied otherwise without departing from such principles.

What is claimed is:

1. In a method for the transmission of commands to a radio-guided missile or satellite in which analog command bits are coded, in a transmitter, with signals from at least one random generator, and decoded in a receiver on the missile or satellite, and in which the signals of each random generator are stored in associated storages, in both the transmitter and the receiver, before the missile or satallite is launched: the improvement comprising supplying, from the random generator, multi-digit binary signals which are assigned individually to specific analog command bits; storing these signals in storages of the receiver; utilizing the stored signals, during transmission of commands, as reference signals for comparison, by correlation, with each coded signal received by radio; and, responsive to a predetermined agreement of the received coded signal with one of the reference signals, generating the analog command bit assigned to such reference signal, as a decoded signal.

2. In a method for the transmission of commands, the improvement claimed in claim 1, including supplying, from an additional random generator, a predetermined additional signal; utilizing the predetermined additional signal to frequency-modulate a carrier frequency; modulating the signals coded in the transmitter upon the frequency-modulated carrier freqeuncy; supplying the same predetermined additional signal from a corresponding random generator to the receiver; and using the last-named supplied predetermined signal to demodulate the carrier frequency.

3. In a method for the transmission of commands, the improvement claimed in claim 1, including utilizing noise generators as the random generators; and utilizing limiters to transform the noise signals into binary signals.

4. In a method for the transmission of commands, the improvement claimed in claim 1, including utilizing feedback shift registers as the random generators; and generating a binary signal of random distribution in accordance with the feedback connection between at least two individual storage places of the feedback shift registers.

5. A method for the transmission of commands, the improvement claimed in claim 1, including utilzing respective time circuits to synchronize the generation and processing of the signals in the transmitter and in the receiver; and synchronizing the two time circuits in advance of launching of the missile.

6. In a method for the transmission of commands, the improvement claimed in claim 2, including transforming the binary signals into two signals having respective different frequencies; mixing the two signals with an intermediate frequency; and utilzing the intermediate frequency to frequency-modulate the carrier frequency.

7. In a method for the transmission of commands, the improvement claimed in claim 6, including, in the receiver, demodulating the intermediate frequency from the carrier frequency; utilizing band filters to separate the two frequency signals from each other; supplying the separated frequency signals to respective envelope detectors; supplying the outputs of the two envelope detectors to a comparator and determining, at the output of the comparator and as a result of the comparison of the two signals supplied thereto, the respective binary signal state of the binary signal.

8. In a method for the transmission of commands, the improvement claimed in claim 7, including storing the output signal of the comparator in parallel in transit storages each associated with the respective one of the first-mentioned storages in the receiver; utilizing respective comparison and summation circuits to compare the signal contents of the associated first-mentioned storage; and, responsive to a predetermined agreement between a signal just stored in each transit storage and a reference signal in the associated first-mentioned storage providing, at the output of a comparison and summation circuit, a signal corresponding to the analog command bit.

9. In a command transmission system for transmitting commands to a radio-guided missile or satellite, of the type including a transmitting station supplying the commands and receiving station in the missile, and in which analog command bits are coded, in the transmitter, with signals from at least one random generator, and decoded in the receiver, with the signals of each random generator being stored in associated storages, in both the transmitter and the receiver, before the missile or satellite is launched: the improvement comprising, in combination, said transmitting station and said receiving station having corresponding numbers of said storages; an analog command signal generator included in said transmission station; a logical circuit connecting the control inputs of the storages of the transmitting station to said analog command signal generator; a signal processing and modulation circuit connected to the outputs of the storages of said transmitting station; a transmitting stage connected to the output of said signal processing and modulation circuit; a transmitting antenna; an umbilical cord connection between said transmitting station and said receiving station; a first reversing switch operable to connect said transmitting stage selectively to either said transmitting antenna or to said umbilical cord connection; a receiving antenna included in the receiving station; a demodulation and signal processing circuit included in said receiving station; a second reversing switch operable to connect said demodulation and signal processing circuit selectively to either said receiving antenna or said umbilical cord connection; third reversing switches connecting the output of said demodulation and signalling processing circuit in parallel to said first-mentioned storages provided in said receiving station; transit storages in said receiving station equal in number to said first-mentioned storages in said receiving station; respective summation and comparison circuits connecting each transit storage to a respective associated first-mentioned storage; said third reversing switches connecting said transit storages in parallel to the output of said demodulation and signal processing circuit; and means operable, responsive to a predetermined agreement of a received coded signal in a transit storage with a reference signal in the associated first-mentioned storage to supply an output signal corresponding to the analog command signal generated in said transmitting station.

10. In a command transmission system, the improvement claimed in claim 9, in which said first-mentioned storages and said transit storages are shift registers.

11. In a command transmission system, the improvement claimed in claim 9, in which each random generator is a noise generator connected in series with a limiter operable to transform the noise signal into a binary signal sequency of random distribution.

12. In a command transmission system, the improvement claimed in claim 10, in which the shift registers in siad transmitting station have individual storage places back-coupled with each other to provide a binary signal sequency of random but periodic distribution from each shift register; and means supplying a cycle frequency to each shift register of said transmitting station.

13. In a command transmission system, the improvement claimed in claim 9, including respective quartz clock controlled time circuits provided in said transmitting station and in said receiving station for the sequential control of the signal flow; said time circuits being interconnected with each other by said umbilical cord connection, until the time the missile is fired, in a manner such that the time circuit of said receiving station is controlled by the time circuit of said transmitting station.

14. In a command transmission system, the improvement claimed in claim 9, including two first oscillators in said transmitting station oscillating with respective different frequencies and each assigned to a respective signal state of the binary signal sequences; a first mixer stage; a switch controlled by the binary signal to be transmitted and operable to connect a corresponding one of said first oscillators to an input of said first mixer stage; a third oscillator, oscillating with an intermediate carrier frequency, connected to the other input of said first mixer stage; a second mixer stage; band filters blocking undesired modulation products, connecting the output of said first mixer stage to an input of said second mixer stage; a fourth oscillator, osicllating with a carrier frequency; means frequency-modulating said fourth osicllator by a control voltage; and a third band filter blocking undesired modulation products, connecting the output of said second mixer stage to said transmitting stage.

15. In a command transmission system, the improvement claimed in claim 14, including an additional random generator connected to said fourth oscillator and generating the control voltage.

16. In a command transmission system, the improvement claimed in claim 14, including a fourth band filter connected to said second reversing switch in the receiving station; a third mixer stage having an input connected to the output of said fourth band filter; a fifth oscillator connected to the other input of said third mixer stage, and oscillating at the same frequency as said fourth oscillator; means frequency-modulating said fifth oscillator with the same time-dependent control voltage modulating said fourth oscillator; a fourth mixer stage; a fifth band filter, tuned to the modulated intermediate carrier frequency, connecting the output of said third mixer stage to an input of said fourth mixer stage; a sixth oscillator, oscillating with the intermediate carrier frequency, connected to the other input of said fourth mixer stage; two sixth band filters, each tuned to the frequency of a respective one of said first oscillators, connected to the output of said fourth mixer stage; a comparator; and respective envelope detectores each connecting a sixth filter to said comparator; the output of said comparator being connected through said third reversing switches to said first-mentioned storages of said receiving station and to said transit storages.

17. In a command transmission system, the improvement claimed in claim 10, including respective threshold value switches connected in series with said summation and comparison circuits of said receiving station; said threshold value switches being balanced so that they respond only when a signal, just stored in the associated transit storage, is completely identical with one of the reference signals stored in the associated shift register; and respective digital-analog converters connected in series with each threshold value switch and providing, at their outputs, a command bit corresponding to the respective reference signal.

18. In a command transmission system, the improvement claimed in claim 17, including a revertive communication line connected in parallel to the outputs of said threshold value switches and connected to said umbilical cord connection, whereby test signals can be supplied to said transmitting station until such time as the missile is fired.

* * * * *